US009129422B2

(12) United States Patent
Mountney et al.

(10) Patent No.: US 9,129,422 B2
(45) Date of Patent: Sep. 8, 2015

(54) COMBINED SURFACE RECONSTRUCTION AND REGISTRATION FOR LAPAROSCOPIC SURGERY

(71) Applicant: Siemens Aktiengesellschaft, Munich (DE)

(72) Inventors: Peter Mountney, Peckham (GB); Maximilian Allan, Banchory (GB); Ankur Kapoor, Plainsboro, NJ (US); Parmeshwar Khurd, San Jose, CA (US); Philip Mewes, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 116 days.

(21) Appl. No.: 14/174,258

(22) Filed: Feb. 6, 2014

(65) Prior Publication Data

US 2014/0241600 A1    Aug. 28, 2014

Related U.S. Application Data

(60) Provisional application No. 61/768,682, filed on Feb. 25, 2013.

(51) Int. Cl.
*G06T 7/00* (2006.01)
*G06T 17/00* (2006.01)

(52) U.S. Cl.
CPC ............... *G06T 17/00* (2013.01); *G06T 7/0012* (2013.01); *G06T 7/0024* (2013.01); *G06T 7/0032* (2013.01); *G06T 7/0075* (2013.01); *G06T 2200/08* (2013.01); *G06T 2207/10012* (2013.01); *G06T 2207/10028* (2013.01); *G06T 2207/10068* (2013.01); *G06T 2207/10081* (2013.01); *G06T2207/10088* (2013.01); *G06T 2207/30096* (2013.01); *G06T 2210/41* (2013.01)

(58) Field of Classification Search
None
See application file for complete search history.

(56) References Cited

U.S. PATENT DOCUMENTS

| | | | |
|---|---|---|---|
| 2008/0144773 A1* | 6/2008 | Bar-Zohar et al. | 378/98.12 |
| 2009/0036902 A1* | 2/2009 | DiMaio et al. | 606/130 |
| 2009/0245600 A1* | 10/2009 | Hoffman et al. | 382/128 |

(Continued)

OTHER PUBLICATIONS

Li-Ming Su, Balazs P. Vagvolgyi, Rahul Agarwal, Carol E. Reiley, Russell H. Taylor, Gregory D. Hager, Augmented Reality During Robot-assisted Laparoscopic Partial Nephrectomy: Toward Real-Time 3D-CT to Stereoscopic Video Registration, Urology, vol. 73, Issue 4, Apr. 2009, pp. 896-900, ISSN 0090-4295, http://dx.doi.org/10.1016/j.urology.2008.11.*

*Primary Examiner* — Utpal Shah (57) ABSTRACT

A computer-implemented method of performing a combined surface reconstruction and registration of stereo laparoscopic images includes a computer system generating an intraoperative three-dimensional model of an anatomical area of interest and receiving a plurality of stereo endoscopic images of the anatomical area of interest from a laparoscope. The computer system performs a first stereo reconstruction process using the stereo endoscopic images to yield a first surface image corresponding to the anatomical area of interest and aligns the first surface image with a surface of the intraoperative three-dimensional model using a rigid registration process. Then, the computer system performs a second stereo reconstruction process using the first surface image and prior knowledge from a pre-operative three dimensional model to yield a second surface image corresponding to the anatomical area of interest and aligns the second surface image with the surface of the intraoperative three-dimensional model using a non-rigid registration process.

20 Claims, 5 Drawing Sheets

(56) References Cited

U.S. PATENT DOCUMENTS

2010/0266171 A1* 10/2010 Wendler et al. ............... 382/128
2011/0105895 A1* 5/2011 Kornblau et al. ............. 600/426
2011/0306986 A1* 12/2011 Lee et al. ...................... 606/130
2012/0294498 A1* 11/2012 Popovic ........................ 382/128
2014/0303491 A1* 10/2014 Shekhar et al. ............... 600/424

* cited by examiner

COMBINED SURFACE RECONSTRUCTION AND REGISTRATION FOR LAPAROSCOPIC SURGERY

This application claims priority to U.S. provisional application Ser. No. 61/768,682 filed Feb. 25, 2013 which is incorporated herein by reference in its entirety.

TECHNICAL FIELD

The following disclosure describes the present invention according to several embodiments directed at methods, systems, and apparatuses for combining surface reconstruction and registration processes for use in laparoscopic surgical applications. The technology is particularly well-suited to, but not limited to, surgical applications which utilize three-dimensional models generated intraoperatively, for example, using a rotational angiography system.

BACKGROUND

In abdominal minimally invasive surgery such as liver resection, a laparoscopic camera is used to provide the surgeon with a visualization of the anatomical area of interest. For example, when removing a tumor, the surgeon's goal is to safely remove the tumor without damaging critical structures such as vessels.

To plan the surgery, a pre-operative image scan (e.g., CT/MRI) is typically used to identify vessels and abnormal tissue and create a three-dimensional segmented model. It is common for this three-dimensional segmented model to be made available during surgery on a monitor, while images generated via the laparoscope are displayed on a separate monitor. Although this provides additional information to the surgeon that may be useful in performing the surgery, it is generally challenging and error-prone to fuse the three-dimensional pre-operative models and laparoscopic images into a single space. For example, the tissue in the anatomical area of interest may be deformed compared to the pre-operative model due to patient respiration and movement between the pre-operative and intraoperative settings. Additionally, the laparoscopic camera generally provides a small field of view that limits the amount of information that may be used for registration of the pre-operative model. Moreover, for some tissues, registration is further complicated due to a lack of tissue surface texture and the lack of common landmarks across modalities.

Thus, it is desired to provide a surface reconstruction and registration technique that allows accurate stereo reconstruction even where the tissue surface lacks texture or has limited texture, provides for registration across modalities where there is a lack of shared landmarks, and correctly adjusts for tissue deformation.

SUMMARY

Embodiments of the present invention address and overcome one or more of the above shortcomings and drawbacks, by providing methods, systems, articles of manufacture, and apparatuses for performing a joint stereo reconstruction and registration exploiting prior knowledge of the surface of the tissue from three-dimensional data. Using the various embodiments disclosed herein, the guidance of the surgical procedure is enhanced by visualizing a pre-operative three-dimensional model in the intraoperative laparoscopic image. In this way, the critical structures and target anatomy may be overlaid on the tissue and subsurface features may be visualized. The techniques discussed herein may be used, for example, to improve accuracy in tumor removal procedures and reduce the required safety margin around the tumor, therefore qualifying more patients for surgery.

According to some embodiments of the present invention, a computer-implemented method of performing a combined surface reconstruction and registration of stereo laparoscopic images includes a computer system generating an intraoperative three-dimensional model of an anatomical area of interest (e.g., using a rotational angiography system) and receiving a plurality of stereo endoscopic images of the anatomical area of interest from a laparoscope. The computer system performs a first stereo reconstruction process using the plurality of stereo endoscopic images to yield a first surface image corresponding to the anatomical area of interest. The first surface image is then aligned with a surface of a pre-operative three-dimensional model using a rigid registration process. Next, the computer system performs a second stereo reconstruction process using the first surface image and prior knowledge (e.g., from the pre-operative three-dimensional model) to yield a second surface image corresponding to the anatomical area of interest. The second surface image is then aligned with the surface of the intraoperative three-dimensional model using a non-rigid registration process.

In other embodiments of the present invention, reconstruction and registration may be performed iteratively. For example, in one embodiment, a computer-implemented method of performing a combined surface reconstruction and registration of stereo laparoscopic images includes generating an intraoperative three-dimensional model of an anatomical area of interest and receiving a plurality of stereo endoscopic images of the anatomical area of interest from a laparoscope. Then, an iterative process including reconstruction and registration is performed a plurality of times until a registration error value is below a threshold value. In one embodiment, this iterative process includes performing a stereo reconstruction process using the plurality of stereo endoscopic images to yield a surface image corresponding to the anatomical area of interest; performing a registration process to align the surface image with a surface of the intraoperative three-dimensional model; and updating the registration error value based on a displacement of one or more points of the surface image resulting from the registration process.

Various techniques may be used for generating the intraoperative three-dimensional model of the anatomical area of interest using the aforementioned methods. For example, in one embodiment, the model is generated by first acquiring a group of rotational projection images via a rotational angiography system. Next, a plurality of two-dimensional images is reconstructed based on the group of rotational projection images. Then, the intraoperative three-dimensional model is generated based on the reconstructed two-dimensional images.

In some embodiments, any of reconstruction processes used in the aforementioned methods may be enhanced based on specular highlights that may be present in stereo endoscopic images. For example, in one embodiment, a reconstruction process includes identifying one or more specular highlights in a plurality of stereo endoscopic images and increasing image density of the plurality of stereo endoscopic images based on the one or more specular highlights. Specular highlights may also (or alternatively) be used to enhance any of the registration processes used in the aforementioned methods. For example, in one embodiment, a registration process utilizes one or more specular highlights to align a surface image corresponding to an anatomical area of interest with the surface of the intraoperative three-dimensional model.

In some embodiments, reconstruction processes may utilize a weighted graph. For example, in one embodiment, a reconstruction process includes constructing a graph based on a plurality of stereo endoscopic images, wherein each vertex in the graph corresponds to a voxel in the plurality of stereo endoscopic images and each vertex is connected to a predetermined number of its nearest neighbors by edges. In one embodiment, this predetermined number is 6. A cost is then determined for each edge of the graph. Next, a weighting is applied to the cost associated with each edge using data from the prior knowledge (e.g., an intraoperative three-dimensional model, a pre-operative three-dimensional model, sparse stereo reconstruction data, and/or manual annotation data). Then, a minimum set of voxels are identified as a respective surface image based on the weighted cost associated with each edge. In some embodiments, each edge in the graph is associated with a first direction, a second direction, or a third direction, and the cost applied to each edge of the graph is determined according to direction. For example, in one embodiment, for each edge associated with the first direction, a first cost may be applied to each respective edge based on a matching strength value between patches in the plurality of stereo endoscopic images. Then, for each edge in the second or the third direction, a second cost may be applied to each respective edge based on a smoothness enforcement value associated the reconstruction process.

According to some embodiments, a system for performing a combined surface reconstruction and registration of stereo laparoscopic images during a surgical operation includes an intraoperative imaging system, a receiver module, and an imaging computer. The intraoperative imaging system is configured to generate an intraoperative three-dimensional model of an anatomical area of interest. In one embodiment, the intraoperative imaging system is a rotational angiography system. The receiver module is configured to receive a plurality of stereo endoscopic images of the anatomical area of interest from a laparoscope. The imaging computer is configured to perform an iterative process a plurality of times until a registration error value is below a threshold value. In one embodiment, this iterative process includes performing a stereo reconstruction process using the plurality of stereo endoscopic images to yield a surface image corresponding to the anatomical area of interest; performing a registration process to align the surface image with a surface of the intraoperative three-dimensional model; and updating the registration error value based on a displacement of one or more points of the surface image resulting from the registration process.

In some embodiments, the aforementioned system includes additional components. For example, in one embodiment, the system further comprises a display configured to present the aligned surface image during the surgical operation. The system may also include a tracking system configured to provide tracking data to the imaging computer for use in an initial registration of the intraoperative imaging system to the laparoscope. In one embodiment, the tracking system is an optical tracking system. However, alternative tracking systems may also be used within the scope of the present invention.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

The following disclosure describes the present invention according to several embodiments directed at methods, systems, and apparatuses for combining surface reconstruction and registration processes for use in laparoscopic surgical applications. The fusion of three-dimensional pre-operative models and laparoscopic images into a single space is challenging due to, for example, tissue deformation, the small field of view of the laparoscopic camera, and lack of common features across modalities. In some embodiments, these challenges are addressed by first generating an intraoperative three-dimensional model of the tissue and registering that model to the laparoscopic images. This alleviates some problems of tissue deformation caused, for example, by insufflations. The various methods, systems, and apparatuses described herein offer several additional benefits over conventional systems including, without limitation, improving registration accuracy, enabling visualization of three-dimensional anatomical models in laparoscopic video, improving the robustness of registration, enabling registration in challenging environments that lack cross modality landmarks, and decreasing safety margin around tumor enabling more patients to qualify for surgery. The various methods, systems, and apparatuses described herein are especially applicable to, but not limited to, pre-operative models generating using rotational angiography imaging systems.

Figure 1:
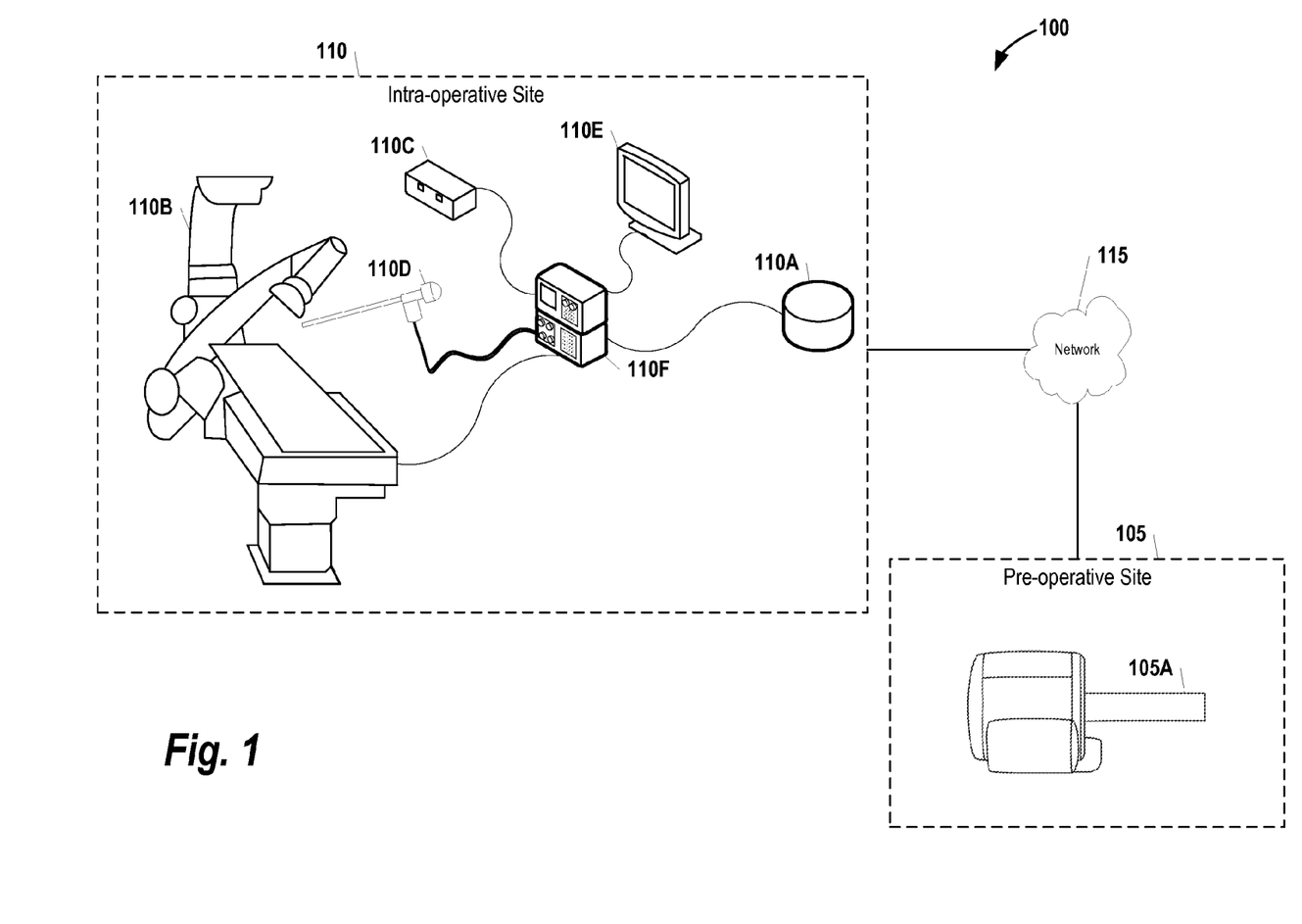
FIG. 1 shows a computer-assisted surgical system, used in some embodiments of the present invention.

FIG. 1 shows a computer-assisted surgical system 100, used in some embodiments of the present invention. The system 100 includes components which may be categorized generally as being associated with a pre-operative site 105 or an intraoperative site 110. In the example of FIG. 1, the various components located at each site 105, 110 may be operably connected with a network 115. Thus, the components may be located at different areas of a facility, or even at different facilities. However, it should be noted that, in some embodiments the pre-operative site 105 and the intraoperative site 110 are co-located. In these embodiments, the network 115 may be absent and the components may be directly connected. Alternatively, a small scale network (e.g., a local area network) may be used.

At the pre-operative site 105, an imaging system 105A is used to gather planning data. In one embodiment, the imaging system 105A gathers images using any of a variety of imaging modalities including, for example, tomographic modalities, such as computed tomography (CT), magnetic resonance imaging (MRI), single-photon emission computed tomography (SPECT), and positron emission tomography (PET). The gathered images are referred to generally herein as the pre-operative planning data. Once this planning data is generated by the imaging system 105A, it is transferred (e.g. via network 115) to a database 110A at the intraoperative site 110.

The intraoperative site 110 includes various components 110A, 110B, 110C, 110D, and 110E operably coupled to an imaging computer 110F. Although FIG. 1 only illustrates a single imaging computer 110F, in other embodiments, multiple imaging computers may be used. Collectively, the one or more imaging computers provide functionality for viewing, manipulating, communicating and storing medical images on computer readable media.

In the example of FIG. 1, imaging device 110B is a rotational angiography system which includes a fixed C-Arm that rotates around the patient to acquire a series of rotational projection images of an anatomical area of interest that are subsequently reconstructed into two-dimensional images. The intraoperative planning images may subsequently be used to generate a three-dimensional model of the area of interest. Collectively, the reconstructed two-dimensional images and three-dimensional model are referred to herein as intraoperative planning data. In some embodiments, image reconstruction and/or three-dimensional model generation occurs within the imaging device 110B itself, using dedicated computer hardware (not shown in FIG. 1). Then, the intraoperative planning data is transferred to the imaging computer 110F for use during surgery. In other embodiments, captured rotational projection images are transferred to the imaging computer 110F for reconstruction into two-dimensional images and generation of the three-dimensional model. It should be noted that, although imaging device 110B is a rotational angiography system in the embodiment illustrated in FIG. 1, in other embodiments, different types of imaging devices including CT, MRI, and structure light devices.

Once the intraoperative planning data are received by the imaging computer 110B, it may be stored in database 110A for later use. Then, when needed, the imaging computer 110F retrieves the intraoperative planning data from the database 110A for presentation on a monitor 110E to help guide the surgical team performing the operation. Alternatively, the imaging computer 110F may immediately present the received intraoperative planning data upon receipt from the imaging device 110B. Although a single monitor 110E is shown in the embodiment illustrated in FIG. 1, in other embodiments multiple monitors may be used, for example, to display different perspectives of the anatomical area of interest (e.g., based on pre-operative planning data or the intraoperative planning data).

During surgery, the surgical team utilizes the intraoperative planning data displayed on the monitor 110E, along with a laparoscope 110D and tracking system 110C. The laparoscope 110D is a medical instrument through which structures within the abdomen and pelvis can be seen during surgery. Typically a small incision is made a patient's abdominal wall allowing the laparoscope to be inserted. There are various types of laparoscopes including, for example, telescopic rod lens systems (usually connected to a video camera) and digital systems where a miniature digital video camera is at the end of the laparoscope. To mimic three-dimensional vision in humans, laparoscopes may be configured to capture stereo images using either a two-lens optical system or a single optical channel. Such laparoscopes are referred to herein as "stereo laparoscopes." The tracking system 110C provides tracking data to the imaging computer 110F for use in registration of the intraoperative planning data (received from device 110B) with data gathered by laparoscope 110D. In the example of FIG. 1, an optical tracking system 110C is depicted. However, other techniques may be used for tracking including, without limitation, electromagnetic (EM) tracking and/or robotic encoders.

Figure 2:
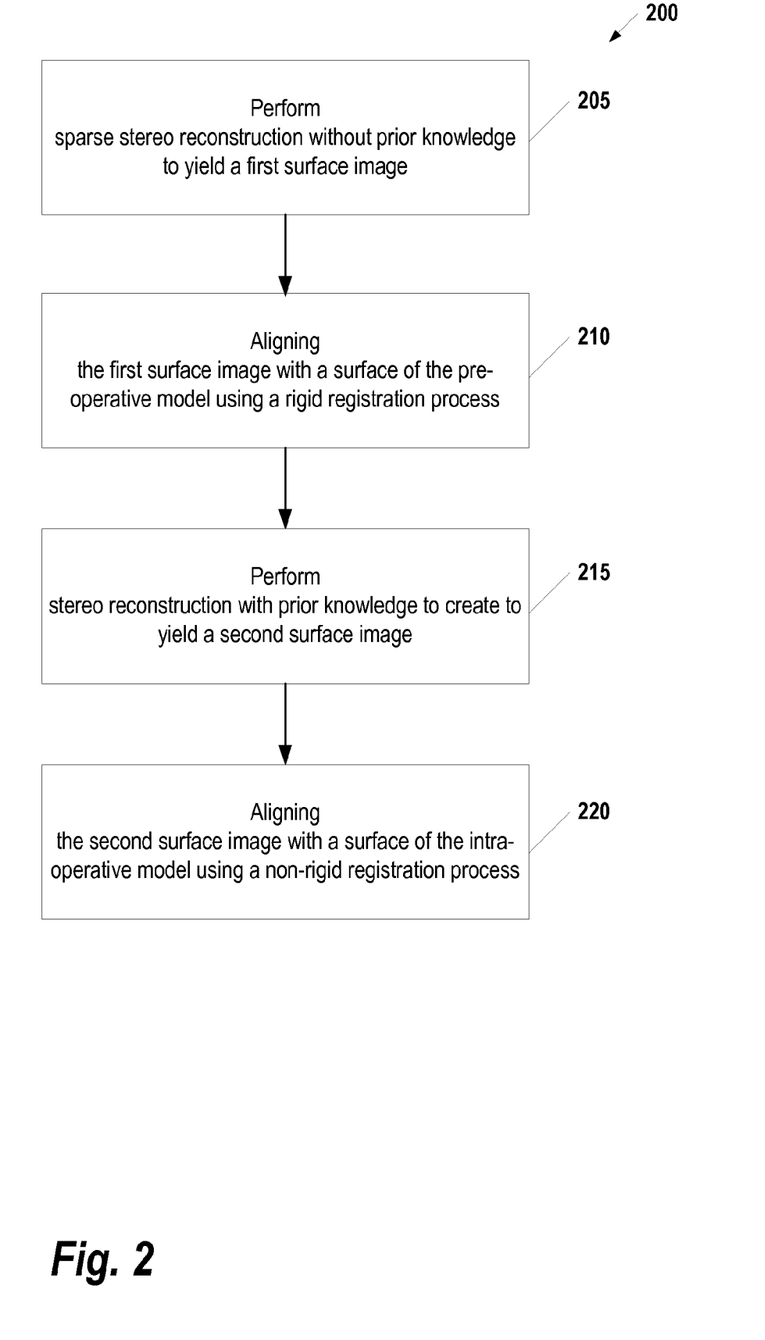
FIG. 2 provides a high-level overview of a process for performing a combined surface reconstruction and registration for stereo laparoscopic surgery, according to some embodiments of the present invention.

FIG. 2 provides a high-level overview of a process 200 for performing a combined surface reconstruction and registration for stereo laparoscopic surgery, according to some embodiments of the present invention. The problem addressed by the process 200 illustrated in FIG. 1 is that, initially, there is not enough information regarding the texture of the anatomical area of interest to enable a stereo reconstruction. However, once an initial registration is performed, the problem can be constrained to get a dense surface. Thus, at 205, a first sparse stereo reconstruction is performed without using prior knowledge. This reconstruction is used at 210 to perform a rigid registration to the pre-operative model. Once this registration is performed, a second stereo reconstruction is performed using prior knowledge to create a dense stereo reconstruction of the surface. This prior knowledge may include, for example, information from a pre-operative three-dimensional model, information from the intraoperative three-dimensional model, sparse stereo reconstruction data, or manual annotation data. Finally, at 220 once a dense surface has been determined, a non-rigid registration to an intraoperative model may be performed over the whole organ. This process results in more accurate results than if only sparse information is used. Additional details, refinements, and alternative implementations of the combined surface reconstruction and registration process 200 illustrated in FIG. 2 are described below with respect to FIGS. 3 and 4.

Figure 3:
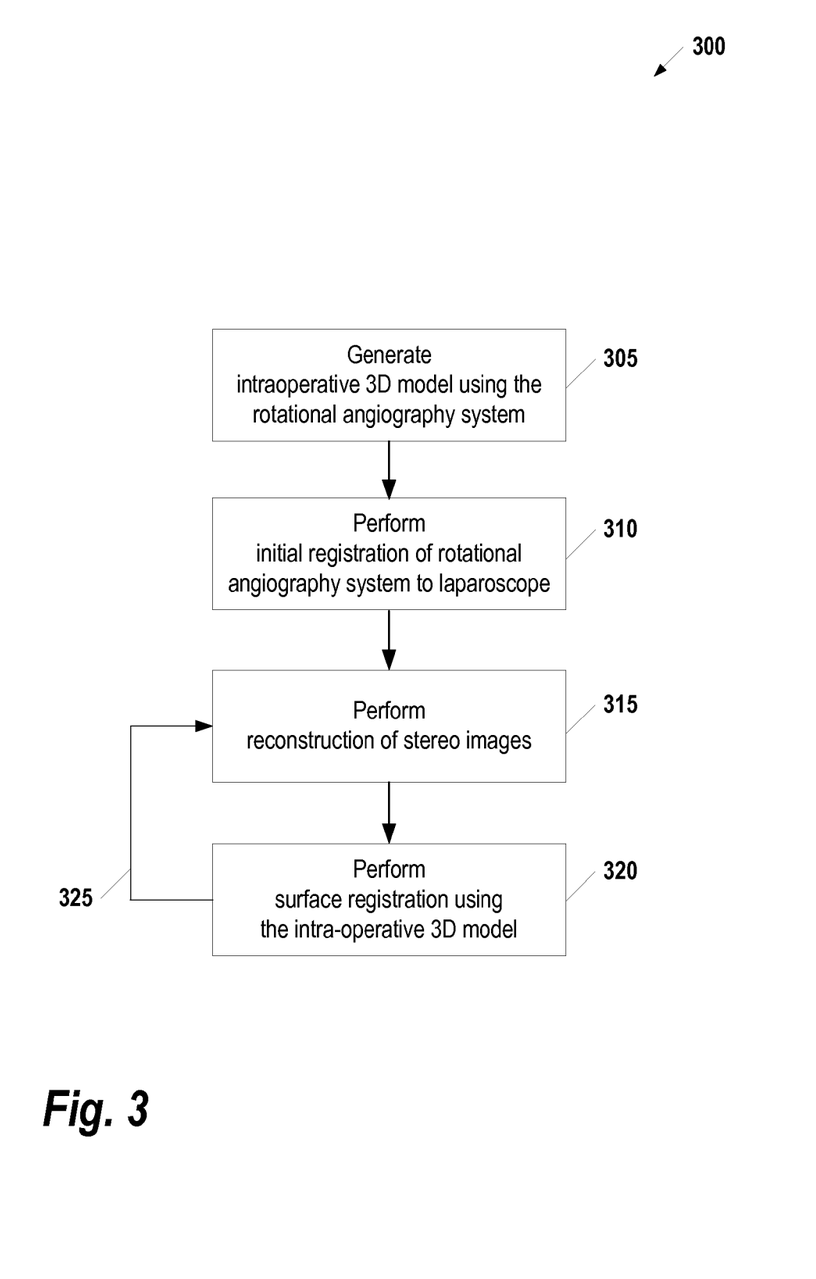
FIG. 3 provides an process for performing a combined surface reconstruction and registration for stereo laparoscopic surgery, according to some embodiments of the present invention.

FIG. 3 provides a process 300 for performing a combined surface reconstruction and registration for stereo laparoscopic surgery, according to some embodiments of the present invention. The process begins at 305 where an intraoperative three-dimensional model of an anatomical area of interest is generated using a rotational angiography system (e.g., device 110B of FIG. 1). For example, in one embodiment, this model is generated in three steps. First, the rotational angiography system acquires a group of rotational projection images. Next, these images are automatically transferred to a computer (e.g., imaging computer 110F of FIG. 1) and reconstructed into two-dimensional (e.g., CT-like) images. Then, the two-dimensional images are used to generate a three-dimensional model of the area of interest. Alternatively, in other embodiments, other techniques known in the art may be used to generate the model.

At 310, an initial registration of the three-dimensional model to the laparoscope (e.g., 110D of FIG. 1) is performed. Various techniques may be applied for registering the three-dimensional model to images from the laparoscope (see e.g., 110D in FIG. 1) including, for example, manual alignment, calibration-based methods that use external tracking devices, landmark-based methods, and shape-based methods. Embodiments based on manual alignment use an expert operator to align the images. Its accuracy is operator and procedure dependent. In other embodiments, calibration methods align a tracking modality such as optical tracking, electromagnetic (EM) tracking, or robotics. In embodiments where landmark-based methods are used, fiducials may be used to compensate for the lack of landmarks across modalities. Embodiments that employ shape-based methods use the shape of the surface of the tissue extracted laparoscopically and the shape from the three-dimensional model to perform registration. The shape-based methods may be based, for example, on the Iterative Closest Point (ICP) algorithm or its variants. It should be noted that the initial registration may contain inaccuracies due to errors, for example, in the camera calibration, hand eye calibration, and/or inherent tracking errors in the optical/EM trackers. These errors may be magnified, for example, when the tracked objects are placed at the proximal end of the laparoscope and the imaging optics are at the distal tip. The initial registration may be performed at different stages of the surgical workflow, depending on which technique is employed for the initial registration. For example, in embodiments where EM or optical tracking is used, the registration may be performed at the same time that stereo endoscopic images are captured by the laparoscope. In other embodiments, where manual alignment techniques are used, image capture may occur after the registration.

Continuing with reference to FIG. 3, at 315, a stereo reconstruction procedure is performed using the stereo endoscopic images to yield a surface image. One example of a reconstruction procedure is described below with respect to FIG. 4. A number of techniques may be used to improve the stereo reconstruction performed at 315. For example, in some embodiments, the reconstruction is enhanced by using specular highlights. Specular highlights are caused by light reflecting from the surface of tissue along the normal. This information about the orientation of the tissue can be incorporated into the stereo reconstruction to increase the density and later assist in registration. For example, the registration process (described below with respect to 320) may utilize the specular highlights in aligning the surface image with the surface of the intraoperative three-dimensional model.

Once an initial surface reconstruction is created, at 320, the reconstructed surface image is passed to a registration component (e.g., operating in an imaging computer 110F shown in FIG. 1) to perform a registration which aligns the reconstructed surface image with the surface of the three-dimensional model generated at 305. The registration performed at 320 may be rigid/affine or non-rigid, using either a sparse or dense stereo surface reconstruction generated with or without prior knowledge. This registration provides a refinement of the initial registration, capable of correcting for errors in the initial registration and deformation of the tissue caused, for example, by respiration. Inputs to the registration component are the two views to be registered—i.e., the reconstructed surface image and the surface of the three-dimensional model. The output of the component is a geometrical transformation which mathematically maps points from one surface to the points in the other surface. Any non-zero displacement between a point on a transformed surface and its corresponding point on the original surface is referred to as a "registration error."

In some embodiments, where the registration performed at 320 is non-rigid, a modified version of the coherent point drift (CPD) method is used. In this formulation, the initial registration may be posed as a Maximum a Posteriori estimation (a.k.a. regularized Maximum Likelihood) problem where local motion is expected to move coherently between the point-sets. Note that the CPD algorithm belongs to a class of iterative closest point (ICP)—like techniques that solve for both point correspondences as well as the non-rigid spatial transformation. In the original CPD algorithm, the Gaussian likelihood only includes point-matching terms for each model point. This approach may be extended to incorporate the surface normals. The normals are estimated from the surface of the intraoperative planning data and the stereo reconstruction. The normal-matching terms may be incorporated in the Gaussian likelihood assuming independence from the point-matching terms. This assumption leads to a tractable algorithm with connections to previous point+normal matching approaches assuming known correspondences. Besides the likelihood term, the original CPD cost function includes a motion-coherent regularization term so that points are deformed in a spatially coherent manner. In some embodiments, to register multiple slowly-moving point-sets, another temporal consistency/coherence regularization term may be added to the CPD cost function. The resulting modification can be done in a batch-wise manner, where multiple points acquired over a time window are simultaneously registered, or in an incremental manner. In some embodiments, the non-rigid registration used to morph the surface of the three-dimensional model to the stereo reconstructed surface can be used to update a biomechanical model of the organ such that the internal structure (e.g., vessels, tumors, etc.) may be deformed to reflect the new tissue shape.

The three-dimensional model generated at 305 is based on images captured at a set point in time and, therefore, may not represent the current exact geometry of the tissue of interest. For example, following the capture of the images used to generate the three-dimensional model, the tissue may have experienced deformation due to respiration. Additionally, the stereo reconstruction performed at 315 may contain noise due to inaccuracies in the reconstruction algorithm. These two sources of noise, possibly along with other noise sources, may introduce inaccuracies into the final registration. Thus, at 325, the stereo reconstruction and registration are incrementally improved by iteratively performing the reconstruction 315 and registration 320 in a loop. In some embodiments, this loop executes a set number of times. In other embodiments, the loop is executed until the registration error is below a predetermined registration threshold is met. The exact value of this threshold may be empirically defined, for example, based on the geometry of the tissue and the target application.

Figure 4:
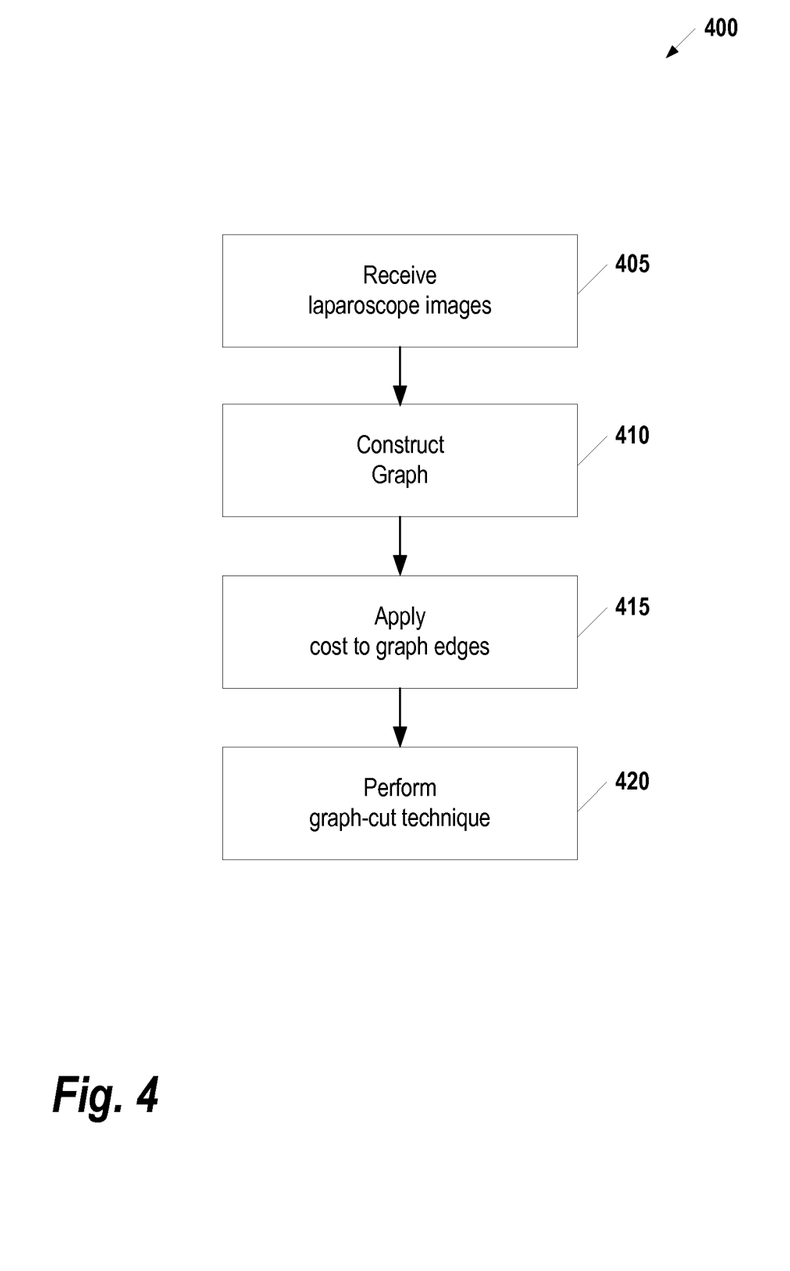
FIG. 4 provides an overview of a reconstruction process for stereo imaging applications, according to some embodiments of the present invention.

FIG. 4 provides an overview of a reconstruction process 400 for stereo imaging applications, according to some embodiments of the present invention. At 405, stereo endoscopic images are received from the laparoscope's camera. Then, at 410 a graph is constructed based on the received images. Various techniques may be used for constructing the graph. For example, a graph may be constructed where each vertex corresponds to a voxel in the volume viewed by the laparoscope's camera and each vertex is connected to a predetermined number of its nearest neighbors by edges. In one embodiment, this predetermined number is 6.

Next, at 415, a cost is applied to each edge of the graph. For example, in one embodiment, each edge in the z direction is given a cost according to the matching strength between patches in the left and right image that this voxel projects to, while the edges in the x and y directions are given costs to enforce smoothness in the reconstruction process (i.e., smoothness enforcement values). Once a cost has been determined for the edges, at 420 a graph-cut technique is performed where the three-dimensional surface reconstruction problem is posed as an energy minimization problem such that:

$$E = \int\int \left( c(u, v, p(u, v)) + \kappa S\left(\frac{\partial p(u, v)}{du}, \frac{\partial p(u, v)}{dv}\right)\right) du\, dv.$$

In this equation, u and v refer to the position of a pixel in a 2D laparoscopic image. For example, if u=10 and v=15 then the pixel is in the 10th column and 15th row of the array that is the image. The function c(u, v, p(u, v)) is a unitary cost function that may be determined using various techniques known in the art, some of which are detailed below. The value K is an empirically defined weighting constant used to affect the strength of the smoothness regularization. S is the pairwise cost function. Using the equation for E, the energy in the graph is then minimized, for example, by using a max-flow min-cut algorithm. It should be noted that the energy minimization process detailed above is only one example of a graph-cut technique that may be used at 420. In other embodiments, variations on the energy minimization equation may be used or other conventional graph cut techniques may be employed. Once the graph-cut procedure is complete, a minimum set of voxels are identified as the reconstructed image.

In some embodiments, prior knowledge may be used to improve the reconstruction process 400 illustrated in FIG. 4. For example, by using strong prior knowledge of the tissue surface, changes in the tissue such as resection or tissue occlusion caused by tools in the field of view of the laparoscope camera may be detected and used to identify a reliable region of tissue that can be used for registration. The prior knowledge may be, for example, in the form of a three-dimensional model (e.g., see 305 of FIG. 3), sparse stereo reconstruction data, or manual annotation. In one embodiment, the prior knowledge includes the geometric depth of the surface from the stereo camera on the laparoscope and the smoothness of the surface of the anatomical object of interest. The prior knowledge may be incorporated into the graph by applying a weighting to the unary cost function such that $$c(u, v, p(u, v)) = \psi(p(u, v)) - d(u, v))f(u, v, p(u, v))$$

with a Gaussian $$\psi(p(u, v)) = \frac{1}{\sqrt{2\sigma^2}} \exp\left(-\frac{x}{2\sigma}\right)^2$$

or a Tukey Biweight function, $$\psi(x) = \begin{cases} \frac{\sigma^2}{6}\left(1 - \left(1 - \frac{x^2}{\sigma^2}\right)^3\right), & \text{if } |x| \le \sigma \\ \frac{\sigma^2}{6}, & \text{if } |x| > \sigma \end{cases}$$

which may be more robust to a bad initial alignment. In these equations, x is p(u, v)−d(uv) where p(u,v) is the depth of a pixel estimated from the stereo reconstruction and d(u,v) is the depth of a pixel from the prior knowledge. The value of a may be empirically defined based on knowledge of the accuracy of the initial localization of the endoscope to the surface. In some embodiments, a smoothness prior may be extracted from the normal of the surface of the prior, for example, where the prior is the three-dimensional model generated intraoperatively via imaging device 110B. This smoothness prior may be incorporated in a similar way into the pairwise function. In other embodiments, prior knowledge about the reliability of texture information on the surface of tissue is used to improve stereo reconstruction. By pre-processing the images to identify textured areas, reliable regions expected to have high accuracy may be identified. Corresponding vertices in the graph may be weighted accordingly since there is high probability that these matches are accurate. In one embodiment, the initial surface reconstruction is performed without prior weighting using high quality features to construct a sparse surface.

It should be noted that the reconstruction process 400 illustrated in FIG. 4 is one example of a process that may be applied to reconstruct the stereo endoscopic images. For example, in some embodiments, conventional surface reconstruction techniques may alternatively be employed, using global image constraints to solve the correspondence problem.

Figure 5:
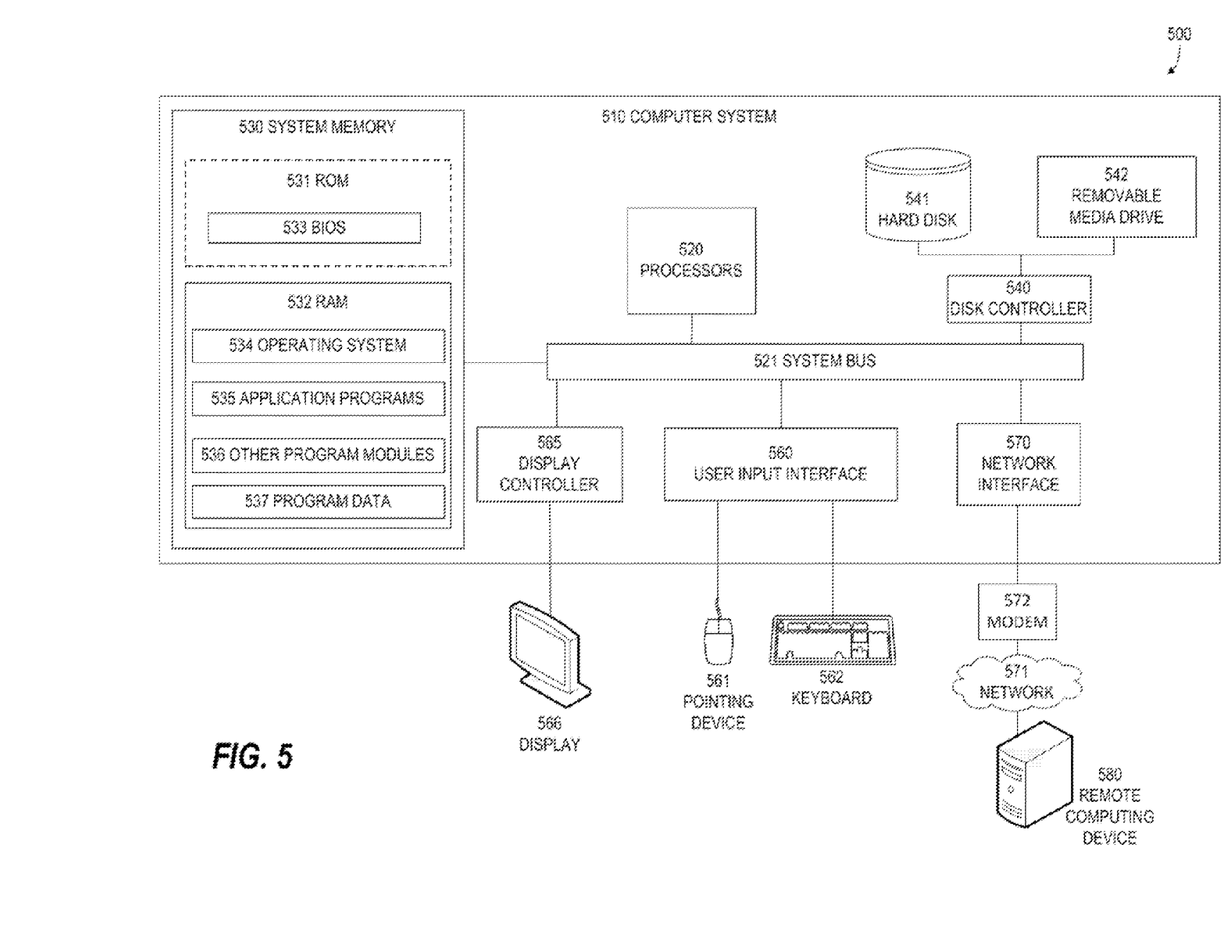
FIG. 5 illustrates an exemplary computing environment within which embodiments of the invention may be implemented.

FIG. 5 illustrates an exemplary computing environment 500 within which embodiments of the invention may be implemented. This environment 500 may be used, for example, to implement a portion of one or more components used at the pre-operative site 105 or the intraoperative site 110 illustrated in FIG. 1. Computing environment 500 may include computer system 510, which is one example of a computing system upon which embodiments of the invention may be implemented. Computers and computing environments, such as computer system 510 and computing environment 500, are known to those of skill in the art and thus are described briefly here.

As shown in FIG. 5, the computer system 510 may include a communication mechanism such as a bus 521 or other communication mechanism for communicating information within the computer system 510. The system 510 further includes one or more processors 520 coupled with the bus 521 for processing the information.

The processors 520 may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Continuing with reference to FIG. 5, the computer system 510 also includes a system memory 530 coupled to the bus 521 for storing information and instructions to be executed by processors 520. The system memory 530 may include computer readable storage media in the form of volatile and/or nonvolatile memory, such as read only memory (ROM) 531 and/or random access memory (RAM) 532. The system memory RAM 532 may include other dynamic storage device(s) (e.g., dynamic RAM, static RAM, and synchronous DRAM). The system memory ROM 531 may include other static storage device(s) (e.g., programmable ROM, erasable PROM, and electrically erasable PROM). In addition, the system memory 530 may be used for storing temporary variables or other intermediate information during the execution of instructions by the processors 520. A basic input/output system 533 (BIOS) containing the basic routines that help to transfer information between elements within computer system 510, such as during start-up, may be stored in ROM 531.

RAM 532 may contain data and/or program modules that are immediately accessible to and/or presently being operated on by the processors 520. System memory 530 may additionally include, for example, operating system 534, application programs 535, other program modules 536 and program data 537.

The computer system 510 also includes a disk controller 540 coupled to the bus 521 to control one or more storage devices for storing information and instructions, such as a magnetic hard disk 541 and a removable media drive 542 (e.g., floppy disk drive, compact disc drive, tape drive, and/or solid state drive). The storage devices may be added to the computer system 510 using an appropriate device interface (e.g., a small computer system interface (SCSI), integrated device electronics (IDE), Universal Serial Bus (USB), or FireWire).

The computer system 510 may also include a display controller 565 coupled to the bus 521 to control a display or monitor 565, such as a cathode ray tube (CRT) or liquid crystal display (LCD), for displaying information to a computer user. The computer system includes an input interface 560 and one or more input devices, such as a keyboard 562 and a pointing device 561, for interacting with a computer user and providing information to the processor 520. The pointing device 561, for example, may be a mouse, a light pen, a trackball, or a pointing stick for communicating direction information and command selections to the processor 520 and for controlling cursor movement on the display 566. The display 566 may provide a touch screen interface which allows input to supplement or replace the communication of direction information and command selections by the pointing device 561.

The computer system 510 may perform a portion or all of the processing steps of embodiments of the invention in response to the processors 520 executing one or more sequences of one or more instructions contained in a memory, such as the system memory 530. Such instructions may be read into the system memory 530 from another computer readable medium, such as a hard disk 541 or a removable media drive 542. The hard disk 541 may contain one or more datastores and data files used by embodiments of the present invention. Datastore contents and data files may be encrypted to improve security. The processors 520 may also be employed in a multi-processing arrangement to execute the one or more sequences of instructions contained in system memory 530. In alternative embodiments, hard-wired circuitry may be used in place of or in combination with software instructions. Thus, embodiments are not limited to any specific combination of hardware circuitry and software.

As stated above, the computer system 510 may include at least one computer readable medium or memory for holding instructions programmed according to embodiments of the invention and for containing data structures, tables, records, or other data described herein. The term "computer readable medium" as used herein refers to any medium that participates in providing instructions to the processor 520 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as hard disk 541 or removable media drive 542. Non-limiting examples of volatile media include dynamic memory, such as system memory 530. Non-limiting examples of transmission media include coaxial cables, copper wire, and fiber optics, including the wires that make up the bus 521. Transmission media may also take the form of acoustic or light waves, such as those generated during radio wave and infrared data communications.

The computing environment 500 may further include the computer system 510 operating in a networked environment using logical connections to one or more remote computers, such as remote computer 580. Remote computer 580 may be a personal computer (laptop or desktop), a mobile device, a server, a router, a network PC, a peer device or other common network node, and typically includes many or all of the elements described above relative to computer system 510. When used in a networking environment, computer system 510 may include modem 572 for establishing communications over a network 571, such as the Internet. Modem 572 may be connected to system bus 521 via user network interface 570, or via another appropriate mechanism.

Network 571 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 510 and other computers (e.g., remote computing system 580). The network 571 may be wired, wireless or a combination thereof. Wired connections may be implemented using Ethernet, Universal Serial Bus (USB), RJ-11, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 571. In some embodiments, computers in computing environment 500 may include a hardware or software receiver module (not shown in FIG. 5) configured to receive one or data items used in performing the techniques described herein.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the UI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The embodiments of the present invention can be included in an article of manufacture comprising, for example, a non-transitory computer readable medium. This computer readable medium may have embodied therein a method for facilitating one or more of the techniques utilized by some embodiments of the present invention. The article of manufacture may be included as part of a computer system or sold separately.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

We claim:

1. A computer-implemented method of performing a combined surface reconstruction and registration of stereo laparoscopic images, the method comprising:
    generating, by a computer system, an intraoperative three-dimensional model of an anatomical area of interest;
    receiving, by the computer system, a plurality of stereo endoscopic images of the anatomical area of interest from a laparoscope;
    performing, by the computer system, a first stereo reconstruction process using the plurality of stereo endoscopic images to yield a first surface image corresponding to the anatomical area of interest;
    aligning, by the computer system, the first surface image with a surface of the a pre-operative three-dimensional model using a rigid registration process;
    performing, by the computer system, a second stereo reconstruction process using the first surface image and prior knowledge from the pre-operative three-dimensional model to yield a second surface image corresponding to the anatomical area of interest; and
    aligning, by the computer system, the second surface image with the surface of the intraoperative three-dimensional model using a non-rigid registration process.

2. The method of claim 1, wherein the intraoperative three-dimensional model is generated using a rotational angiography system.

3. The method of claim 2, wherein generating the intraoperative three-dimensional model of the anatomical area of interest comprises:
    acquiring a group of rotational projection images via the rotational angiography system;
    reconstructing a plurality of two-dimensional images based on the group of rotational projection images; and
    generating the intraoperative three-dimensional model based on the reconstructed two-dimensional images.

4. The method of claim 2, wherein at least one of the first stereo reconstruction process and the second stereo reconstruction process comprises:
    identifying one or more specular highlights in the plurality of stereo endoscopic images; and
    increasing image density of the plurality of stereo endoscopic images based on the one or more specular highlights.

5. The method of claim 4, wherein at least one of the rigid registration process and the non-rigid registration process utilizes the one or more specular highlights in aligning a respective surface image with the surface of the intraoperative three-dimensional model.

6. The method of claim 1, wherein at least one of the first stereo reconstruction process and the second stereo reconstruction process comprises:
    constructing a graph based on the plurality of stereo endoscopic images, wherein each vertex in the graph corresponds to a voxel in the plurality of stereo endoscopic images and each vertex is connected to a predetermined number of its nearest neighbors by edges;
    determining a cost for each edge of the graph;
    applying a weighting to the cost associated with each edge using data from the prior knowledge; and
    identifying a minimum set of voxels as a respective surface image based on the weighted cost associated with each edge.

7. The method of claim 6, wherein the predetermined number is 6.

8. The method of claim 6, wherein each edge is associated with a first direction, a second direction, or a third direction and wherein determining the cost to each edge of the graph comprises:
    for each edge associated with the first direction, applying a first cost to each respective edge based on a matching strength value between patches in the plurality of stereo endoscopic images; and
    for each edge in the second or the third direction, applying a second cost to each respective edge based on a smoothness enforcement value associated with at least one of the first stereo reconstruction process and the second stereo reconstruction process.

9. A computer-implemented method of performing a combined surface reconstruction and registration of stereo laparoscopic images, the method comprising:
    generating an intraoperative three-dimensional model of an anatomical area of interest;
    receiving a plurality of stereo endoscopic images of the anatomical area of interest from a laparoscope; and
    performing, by a computer, an iterative process a plurality of times until a registration error value is below a threshold value, the iterative process comprising:
        performing a stereo reconstruction process using the plurality of stereo endoscopic images to yield a surface image corresponding to the anatomical area of interest,
        performing a registration process to align the surface image with a surface of the intraoperative three-dimensional model, and
        updating the registration error value based on a displacement of one or more points of the surface image resulting from the registration process.

10. The method of claim 9, wherein generating the intraoperative three-dimensional model of the anatomical area of interest comprises:
    acquiring a group of rotational projection images via a rotational angiography system;
    reconstructing a plurality of two-dimensional images based on the group of rotational projection images; and generating the intraoperative three-dimensional model based on the reconstructed two-dimensional images.

11. The method of claim 9, wherein the stereo reconstruction process comprises:
   identifying one or more specular highlights in the plurality of stereo endoscopic images;
   increasing image density of the plurality of stereo endoscopic images based on the one or more specular highlights.

12. The method of claim 11, wherein the registration process utilizes the one or more specular highlights to align the surface image with the surface of the intraoperative three-dimensional model.

13. The method of claim 11, wherein performing the stereo reconstruction process using the plurality of stereo endoscopic images to yield the surface image comprises:
   constructing a graph based on the plurality of stereo endoscopic images, wherein each vertex in the graph corresponds to a voxel in the plurality of stereo endoscopic images and each vertex is connected to a predetermined number of its nearest neighbors by edges;
   determining a cost for each edge of the graph;
   applying a weighting to the cost associated with each edge based on prior knowledge data; and
   identifying a minimum set of voxels as the surface image based on the weighted cost associated with each edge.

14. The method of claim 13, wherein each edge is associated with a first direction, a second direction, or a third direction and wherein determining the cost to each edge of the graph comprises:
   for each edge associated with the first direction, applying an first cost to each respective edge based on a matching strength value between patches in the plurality of stereo endoscopic images; and
   for each edge in the second or the third direction, applying a second cost to each respective edge based on a smoothness enforcement value associated with the stereo reconstruction process.

15. The method of claim 13, wherein the prior knowledge data includes one or more of the intraoperative three-dimensional model, a pre-operative three-dimensional model, sparse stereo reconstruction data, or manual annotation data.

16. A system for performing a combined surface reconstruction and registration of stereo laparoscopic images during a surgical operation, the system comprising:
   an intraoperative imaging system configured to generate an intraoperative three-dimensional model of an anatomical area of interest;
   a receiver module configured to receive a plurality of stereo endoscopic images of the anatomical area of interest from a laparoscope; and
   an imaging computer configured to perform an iterative process a plurality of times until a registration error value is below a threshold value, the iterative process comprising:
      performing a stereo reconstruction process using the plurality of stereo endoscopic images to yield a surface image corresponding to the anatomical area of interest,
      performing a registration process to align the surface image with a surface of the intraoperative three-dimensional model, and
      updating the registration error value based on a displacement of one or more points of the surface image resulting from the registration process.

17. The system of claim 16, wherein the intraoperative imaging system comprises a rotational angiography system.

18. The system of claim 17, further comprising a display configured to present the aligned surface image during the surgical operation.

19. The system of claim 17, further comprising a tracking system configured to provide tracking data to the imaging computer for use in an initial registration of the intraoperative imaging system to the laparoscope.

20. The system of claim 19, wherein the tracking system is an optical tracking system.

* * * * *